3,061,575
METHOD FOR CURING ROOM-TEMPERATURE-VULCANIZING ORGANOPOLYSILOXANE RUBBER
James R. Russell, Midland, Mich., assignor to Dow Corning Corporation, Midland, Mich., a corporation of Michigan
No Drawing. Filed Aug. 1, 1960, Ser. No. 46,327
17 Claims. (Cl. 260—37)

This invention relates to a method for curing room-temperature-vulcanizing organopolysiloxane rubber in relatively deep section and to the heat stable compositions so formed.

In the field of silicone rubber, based primarily on diorganopolysiloxanes, much work has been done in developing rubbers which vulcanize and cure at room temperature by the interaction of chosen ingredients. One of these systems employs diorganopolysiloxanes endblocked with acyloxy groups. One of the advantages of this particular system is the fact that the product adheres well to any surface in contact during the cure. However, this system does not cure well in thick or deep section, i.e. films thicker than about ¼ of inch, or in confined spaces. Another disadvantage of this system is its poor heat stability in confined spaces, i.e. poor confined heat stability.

One of the objects of this invention is to provide a system similar to that identified above which will cure satisfactorily in deep section or in confined spaces. Another object of this invention is to provide such a system which has improved confined heat stability over similar previously-known systems. A third object of this invention is to provide a system having the above advantages without sacrificing the excellent bonding properties which are characteristic of the carboxylated system. These objects are satisfied by this invention.

This invention resides in a method comprising reacting (a) a hydroxylated siloxane of the formula $$HO[SiR_2O]_nH$$

(b) a silane of the formula $R'Si(OAc)_3$ in an amount such that there is at least 0.33 mol of silane (b) per mol of silicon-bonded hydroxyl group in siloxane (a), and (c) magnesium oxide in an amount such that there are at least 1.5 mols of oxide (c) per mol of silane (b), in which components each Ac is a saturated aliphatic monoacyl radical derived from a carboxylic acid, each R and each R' are selected from the group consisting of monovalent hydrocarbon radicals, halogenated monovalent hydrocarbon radicals and cyanoalkyl radicals and each n is a positive integer of at least 5.

For the purpose of this invention the Ac groups can be any saturated aliphatic monoacyl radical derived from a carboxylic acid such as, for example, the propionyl, acetyl, formyl, butyryl, iso-valeryl, hexoyl, 2-ethylhexoyl, octanoyl and stearyl radicals, preferably the acetyl radical. Also, for the purpose of this invention R and R' can each be any monovalent hydrocarbon radical, e.g. any alkyl radical such as the methyl, ethyl, isopropyl, tertiary-butyl, dodecyl, octadecyl or myricyl radicals; any alkenyl radical such as the vinyl, allyl or hexenyl radicals; any cycloaliphatic hydrocarbon radical such as the cyclobutyl, cyclopentyl, cyclohexyl, cyclopentenyl or cyclohexenyl radical; any alkaryl hydrocarbon radical such as the benzyl or β-phenylethyl radical and any aromatic hydrocarbon radical such as the phenyl, tolyl, xylyl, naphthyl, xenyl or phenanthryl radical. R and R' can also be any halogenated monovalent hydrocarbon radical such as for example, the chloromethyl, pentafluorobutyl, trifluorovinyl, chlorophenyl, bromophenyl, α,α,α-trifluorotolyl, bromoxenyl, chlorotrifluorocyclobutyl, chlorocyclohexyl or iodophenyl radical.

In addition either R or R' or both can be any cyanoalkyl radical such as, for example, the beta-cyanoethyl, gamma-cyanopropyl, omega-cyanobutyl, beta-cyanopropyl, gamma-cyanobutyl or omega-cyanooctadecyl radical. When the products of this invention contain cyanoalkyl radicals it is preferred that such radicals be attached to at least 1 mol percent of the silicon atoms in the siloxane elastomer.

While the invention involves primarily the reaction of a hydroxy-endblocked diorganopolysiloxane (a), a monoorganotriacyloxysilane (b) and magnesium oxide (c), the invention includes modifications such as the reaction at room temperature of part of the siloxane (a) with the silane (b) to form a reactive intermediate (d)

$$(AcO)_2SiR'O[SiR_2O]_nSiR'(OAc)_2$$

Such an intermediate (d) can be substituted for silane (b) in the method of this invention by maintaining the same ratio of silicon-bonded acyloxyl radicals to silicon-bonded hydroxyl radicals in the system.

For the purpose of this invention the polymer size of the compositions can vary from thin fluids where n has a value of 5 to non-flowing gums where n has a value of 10,000 or more. For the purpose of this invention mixtures of compounds can be employed which contain molecular species of varying values for n. Different acyl groups can be present in any one molecule and various types of R and R' groups can appear in any one molecule. In short, single acyloxy silanes can be employed in the reaction or mixtures of two or more different acyloxy silanes may be employed. The hydroxylated siloxane can be a homopolymer or it can be a copolymer of two or more different siloxane units. Mixtures of two or more hydroxylated siloxanes can be employed. Often in actual commercial operation the compositions employed will be mixtures of several molecular species where n has different values. A pure species where all of the molecules have the same degree of polymerization can also be used.

While it is necessary that there be at least one silicon-bonded acyloxyl radical per silicon-bonded hydroxyl radical in the reactants, i.e. 0.33 mol of monomethyltriacetoxysilane per mol of silicon-bonded hydroxyl groups, it is preferable that there be at least a 100 percent molar excess of acyloxyl radicals. Similarly, while a large molar excess, e.g. a 20-fold excess, of silicon-bonded acyloxyl radicals can be present in the preparation of intermediates such as (d) described above, it is preferable that no more than a 1000 percent molar excess be present in the initial reactants for the system as a whole. It should be understood, however, that the method of this invention is operative with more than 1000 percent molar excess of silicon-bonded acyloxyl radicals over silicon-bonded hydroxyl radicals in the reactants if desired.

While it is necessary that there be at least about 1.5 mols of magnesium oxide (c) per mol of silane (b) or the equivalent, it is preferable to employ at least a 2-fold excess of magnesium oxide to insure even and thorough dispersion of this ingredient in the system. However, a 10-fold excess or more of oxide (c) can be employed, if desired, without affecting the curing mechanism of the system and affecting the curing rate only by dilution of the reactants.

The method of this invention operates spontaneously upon the mixing of the named reactants to produce a cured rubber. Temperatures ranging from 15° C. to 100° C. are sufficient although higher or lower temperatures can be employed depending only on the freezing point, boiling point or decomposition temperature of any reactant. The rate of cure can be slowed by increasing the size of the R and R' radicals in (a) and/or (b), by increasing the size of the Ac radical or by increasing the ratio of silicon-bonded acyloxy radicals to silicon-bonded hydroxyl radicals. For commercial use the best method for practicing this invention is to prepare two components, one component containing half the desired hydroxylated siloxane (a) and the magnesium oxide and the other component containing the rest of the siloxane (a) and the monoorganotriacyloxysilane (b). While the ingredients in the second component will interact, the large excess of silane (b) in the component prevents curing in the absence of the magnesium oxide.

The method of this invention is useful in producing at room temperature cured rubber in deep section having high confined heat stability. Such materials can be employed while fluid for calking or potting so that the cured product is excellent as a calking or potting material, i.e. any application requiring an easily spreadable material in a confined space. Such applications appear, for example, in buildings and automotive equipment. This utility is enhanced by the fact that the compositions of this invention adhere tenaciously to a wide variety of materials such as glass, porcelain, wood, metals and organic plastics.

The properties of the compositions produced in this invention can be altered by the inclusion of such extra materials as plasticizers, pigments, oxidation inhibitors, heat stability additives, dielectric materials and fillers of which the last is most common. The preferred fillers are what are known as "hydrophobed reinforcing silica" fillers. A "reinforcing" filler is now recognized as one having a surface area of at least 50 square meters per gram. Preferably, fillers having surface areas greater than 150 square meters per gram are employed. Reinforcing silica fillers are "hydrophobed" preferably by reacting the silicon-bonded hydroxyl groups on the silica surface with alkoxylated or chlorinated silanes as described in U.S. Patent 2,863,846. The chlorosilane treatment involves merely mixing in solvent the silica in contact with the silane and evaporating off the excess silane and solvent. Silica having surface areas up to 900 square meters per gram can also be hydrophobed by replacing the silicon-bonded hydroxyl groups with silicon-bonded alkoxyl groups as shown in U.S. Patent 2,657,149. Hydrophobed reinforcing silica fillers are employed in the compositions of this invention in an amount ranging from about 5 to 90 parts by weight based on 100 parts of siloxane (a).

The following examples are illustrative only and should not be construed as limiting the invention the scope of which is properly delineated in the claims. The viscosities expressed in the examples were measured at 25° C. Quantitative measurements are expressed in parts by weight.

*Example 1*

A base composition A was prepared consisting of 100 parts of a hydroxy-endblocked 3,3,3-trifluoropropylmethylpolysiloxane having a viscosity of from 30,000 to 40,000 cs. (M.W.≅20,000) and about 0.17 percent by weight silicon-bonded hydroxyl groups, 15 parts of a 1000 cs. trimethylsiloxy-endblocked 3,3,3-trifluoropropylmethylpolysiloxane, 15 parts of a hydrophobed reinforcing silica filler and 1 part of a powdered aluminum pigment.

95.6 parts of base composition A were mixed with 4.4 parts of methyltriacetoxysilane equivalent to 2.74 mols of silane per mol of silicon-bonded hydroxyl groups in the hydroxy-endblocked siloxane in A and 10 parts of magnesium oxide equivalent in 12.5 mols of magnesium oxide per mol of silane. This composition was poured in a ½ inch section confined in a bottle cap. The composition cured to a rubber at room temperature in 18 hours. After one week the sample was heated for 18 hours at 200° C. and remained a rubber. The results are the same when the trimethylsiloxy-endblocked 3,3,3-trifluoropropylmethylpolysiloxane and the powdered aluminum pigment are omitted from the above composition.

*Example 2*

95.6 parts of base composition A were mixed with 4.4 parts of methyltriacetoxysilane and 2.5 parts of magnesium oxide equivalent to 3.1 mols of magnesium oxide per mol of silane. This composition was poured into a ½ inch section confined in a bottle cap. After about 72 hours at room temperature the composition had cured to a heat stable rubber.

*Example 3*

100 parts of base composition A were mixed with 4.6 parts of $MeSi(OAc)_3$ to form a composition in which essentially all the hydroxyy-endblocked siloxane in A was endblocked with monomethyldiacetoxysiloxyl groups. 100 parts of base composition A were mixed with 3.6 parts of magnesium oxide. The two components were then mixed together giving a mixture containing an approximately equimolar ratio of hydroxy-endblocked siloxane and monomethyldiacetoxysiloxy-endblocked siloxane, sufficient unreacted monomethyltriacetoxysilane to give a ratio of about 1.1 mols of total original silane employed per mol of silicon-bonded hydroxyl groups in the original 200 parts of base composition A, 4.3 mols of magnesium oxide per mol of total original silane and about 18 mols of magnesium oxide per mol of monomethyldiacetoxysiloxy-endblocked siloxane.

A thin film of this composition was allowed to cure in a totally confined space for seven days at room temperature. Immediately after removal from the confined space this film was cut into sample pieces which were sealed in aluminum foil and heated for 18 hours at 200° C. A control sample was similarly heat aged exposed to the atmosphere. After the test the durometers of the test samples were about 32 and the durometer of the control sample was about 33.

*Example 4*

When an excess of methyltriacetoxysilane is reacted with the following hydroxylated siloxanes, the following products are obtained:

| Hydroxylated siloxane | Reaction product |
| --- | --- |
| $HO[Si(C_2H_5)(CH_3)O]_{100}H$ | $(CH_3COO)_2Si(CH_3)O[Si(C_2H_5)(CH_3)O]_{100}Si(CH_3)(OOCCH_3)_2$ |
| $HO[Si(C_6H_5)_2O[Si(CH_3)_2O]_5]_{200}H$ | $(CH_3COO)_2Si(CH_3)O[Si(C_6H_5)_2O[Si(CH_3)_2O]_5]_{200}Si(CH_3)(OOCCH_3)_2$ |
| $HO[Si(CH_3)(C_6H_{11})O]_{100}H$ | $(CH_3COO)_2Si(CH_3)O[Si(CH_3)(C_6H_{11})O]_{100}Si(CH_3)(OOCCH_3)_2$ |
| $HO[Si(CH_3)(C_6H_4Cl)O]_{25}H$ | $(CH_3COO)_2Si(CH_3)O[Si(CH_3)(C_6H_4Cl)O]_{25}Si(CH_3)(OOCCH_3)_2$ |
| $HO[Si(CH_3)(C_{18}H_{37})O]_{10}H$ | $(CH_3COO)_2Si(CH_3)O[Si(CH_3)(C_{18}H_{37})O]_{10}Si(CH_3)(OOCCH_3)_2$ |
| $HO[Si(CH_3)(C_6H_4CF_3)O]_8H$ | $(CH_3COO)_2Si(CH_3)O[Si(CH_3)(C_6H_4CF_3)O]_8Si(CH_3)(OOCCH_3)_2$ |
| $HO[Si(CH_3)(CH_2CH_2CH_2CN)O[Si(CH_3)_2O]_4]_{250}H$ | $(CH_3COO)_2Si(CH_3)O[Si(CH_3)(CH_2CH_2CH_2CN)O[Si(CH_3)_2O]_4]_{250}Si(CH_3)(OOCCH_3)_2$ |

When each of these reaction products is purified by stripping at 100° C. at 0.5 mm. Hg to remove the remaining acetic acid and excess methyltriacetoxysilane and is mixed in an equimolar ratio with $$HO[Si(CH_3)_2O]_{1007}H$$

and with magnesium oxide in an amount equivalent to 16 mols of magnesium oxide per mol of the above reaction products, the resulting mixtures cure in a confined space within 72 hours to heat stable rubbers.

*Example 5*

When the following acyloxy silanes are reacted with $HO[Si(CH_3)_2O]_{439}H$, the following products are obtained:

| Acyloxy silane | Reaction product |
|---|---|
| $C_6H_5Si(OOCCH_3)_3$ | $(CH_3COO)_2Si(C_6H_5)O[Si(CH_3)_2O]_{439}Si(C_6H_5)(OOCCH_3)_2$ |
| $(CH_3)_2CHCH_2Si(OOCCH_3)_3$ | $(CH_3COO)_2Si[CH_2CH(CH_3)_2]O[Si(CH_3)_2O]_{439}Si[CH_2CH(CH_3)_2](OOCCH_3)_2$ |
| $C_2H_5Si(OOCCH_3)_3$ | $(CH_3COO)_2Si(C_2H_5)O[Si(CH_3)_2O]_{439}Si(C_2H_5)(OOCCH_3)_2$ |
| $CF_3CH_2CH_2Si(OOCCH_3)_3$ | $(CH_3COO)_2Si(CH_2CH_2CF_3)O[Si(CH_3)_2O]_{439}Si(CH_2CH_2CF_3)(OOCCH_3)_2$ |
| $C_{12}H_{25}Si(OOCCH_3)_3$ | $(CH_3COO)_2Si(C_{12}H_{25})O[Si(CH_3)_2O]_{439}Si(C_{12}H_{25})(OOCCH_3)_2$ |
| $Br_2C_6H_3CH_2Si(OOCCH_3)_3$ | $(CH_3COO)_2Si(CH_2C_6H_3Br_2)O[Si(CH_3)_2O]_{439}Si(CH_2C_6H_3Br_2)(OOCCH_3)_2$ |
| $NCCH_2CH_2Si(OOCCH_3)_3$ | $(CH_3COO)_2Si(CH_2CH_2CN)O[Si(CH_3)_2O]_{439}Si(CH_2CH_2CN)(OOCCH_3)_2$ |
| $CH_3Si(OOCH)_3$ | $(HCOO)_2Si(CH_3)O[Si(CH_3)_2O]_{439}Si(CH_3)(OOCH)_2$ |
| $CH_3Si(OOCC_7H_{15})_3$ | $(C_7H_{15}COO)_2Si(CH_3)O[Si(CH_3)_2O]_{439}Si(CH_3)(OOCC_7H_{15})_2$ |

When each of these reaction products is purified by stripping at 100° C. at 0.5 mm. Hg to remove the remaining acid and excess acyloxysilane and is mixed in an equimolar ratio with $HO[Si(CH_3)_2O]_{439}H$ and with magnesium oxide in an amount equivalent to 8 mols of magnesium oxide per mol of the above reaction products, the resulting mixtures cure in a confined space within 72 hours to heat stable rubbers.

*Example 6*

20 parts of a gum of the formula $HO[Si(CH_3)_2O]_{3000}H$, 6.7 parts of a reinforcing silica filler having trimethylsilyl groups attached to the surface thereof and 2 parts of methyltriacetoxysilane were mixed with agitation in 150 ml. of 100° C. petroleum ether. Reaction of the gum and the silane occurred to give a solution of the composition $$(CH_3COO)_2Si(CH_3)O[Si(CH_3)_2O]_{3000}Si(CH_3)(OOCCH_3)_2$$

When 2 parts of magnesium oxide and 2 parts of $HO[Si(CH_3)_2O]_{300}H$ are dispersed in this solution, the solution is applied to a metal panel, the product cures to a tough, rubbery film which remains rubbery after 18 hours at 200° C. when completely confined by foil or when exposed to air.

That which is claimed is:

1. A method comprising reacting (a) a hydroxylated siloxane of the formula $HO[SiR_2O]_nH$, (b) a silane of the formula $R'Si(OAc)_3$ in an amount such that there is at least 0.33 mol of silane (b) per mol of silicon-bonded hydroxyl group in siloxane (a), and (c) magnesium oxide in an amount such that there are at least 1.5 mols of oxide (c) per mol of silane (b), in which components each Ac is a saturated aliphatic monoacyl radical derived from a carboxylic acid, each R and each R' are selected from the group consisting of monovalent hydrocarbon radicals, halogenated monovalent hydrocarbon radicals and cyanoalkyl radicals and each $n$ is a positive integer of at least 5.

2. A method in accordance with claim 1 in which each Ac is an acetyl radical and each R and each R' are methyl radicals.

3. A method in accordance with claim 1 in which each Ac is an acetyl radical, each R' is a methyl radical, some of the R groups are phenyl radicals and the remainder of the R groups are methyl radicals.

4. The method comprising reacting (a) a compound of the formula $HO[Si(CH_3)(CH_2CH_2CF_3)O]_nH$ in which each $n$ is a positive integer of at least 5, (b) methyltriacetoxysilane in an amount such that there is at least 0.33 mol of silane (b) per mol of silicon-bonded hydroxyl groups in siloxane (a), and (c) magnesium oxide in an amount such that there are at least 1.5 mols of oxide (c) per mol of silane (b).

5. The method comprising reacting (a) a compound of the formula $HO[SiR_2O]_nH$ and (d) a compound of the formula $(AcO)_2SiR'O[SiR_2O]_nSiR'(OAc)_2$ in an approximately equimolar ratio, and (c) magnesium oxide in an amount such that there are 2 mols of oxide (c) per mol of compound (d), in which components each Ac is a saturated aliphatic monoacyl radical derived from a carboxylic acid, each R and each R' are selected from the group consisting of monovalent hydrocarbon radicals, halogenated monovalent hydrocarbon radicals and cyanoalkyl radicals and each $n$ is a positive integer of at least 5.

6. A method in accordance with claim 2 in which each Ac is an acetyl radical and each R and each R' are methyl radicals.

7. A method in accordance with claim 2 in which each Ac is an acetyl radical, each R' is a methyl radical, some of the R groups are phenyl radicals and the remainder of the R groups are methyl radicals.

8. The method comprising reacting (a) a compound of the formula $HO[Si(CH_3)(CH_2CH_2CF_3)O]_nH$ and (d) a compound of the formula $$(CH_3CO\text{O})_2Si(CH_3)O[Si(CH_3)(CH_2CH_2CF_3)O]_nSi(CH_3)(OOCCH_3)_2$$

in an approximately equimolar ratio, each $n$ in (a) and (d) being a positive integer of at least 5, and (c) magnesium oxide in an amount such that there are at least 2 mols of oxide (c) per mol of compound (d).

9. A composition consisting essentially of the reaction product of (a) a hydroxylated siloxane of the formula $HO[SiR_2O]_nH$, (b) a silane of the formula $R'Si(OAc)_3$ in an amount such that there is at least 0.33 mol of silane (b) per mol of silicon-bonded hydroxy groups in siloxane (a), and (c) magnesium oxide in an amount such that there are at least 1.5 mols of oxide (c) per mol of silane (b), in which components each Ac is a saturated aliphatic monoacyl radical derived from a carboxylic acid, each R and each R' are selected from the group consisting of monovalent hydrocarbon radicals, halogenated monovalent hydrocarbon radicals and cyanoalkyl radicals and each $n$ is a positive integer of at least 5.

10. A composition in accordance with claim 9 in which each Ac is an acetyl radical and each R and each R' are methyl radicals.

11. A composition in accordance with claim 9 in which each Ac is an acetyl radical, each R' is a methyl radical, some of the R groups are phenyl radicals and the remainder of the R groups are methyl radicals.

12. A composition consisting essentially of the reaction product of (a) a compound of the formula $$HO[Si(CH_3)(CH_2CH_2CF_3)O]_nH$$

in which each $n$ is a positive integer of at least 5, (b) methyltriacetoxysilane in an amount such that there is at least 0.33 mol of silane (b) per mol of silicon-bonded hydroxyl groups in siloxane (*a*), and (*c*) magnesium oxide in an amount such that there are at least 1.5 mols of oxide (*c*) per mol of silane (*b*).

13. The composition of claim 9 with from 5 to 90 parts by weight per 100 parts of (*a*) of a hydrophobed reinforcing silica filler.

14. The composition of claim 10 with from 5 to 90 parts by weight per 100 parts of (*a*) of a hydrophobed reinforcing silica filler.

15. The composition of claim 11 with from 5 to 90 parts by weight per 100 parts of (*a*) of a hydrophobed reinforcing silica filler.

16. The composition of claim 12 with from 5 to 90 parts by weight per 100 parts of (*a*) of a hydrophobed reinforcing silica filler.

17. A composition prepared in accordance with claim 5.

References Cited in the file of this patent

UNITED STATES PATENTS

| | | |
|---|---|---|
| 2,723,966 | Youngs | Nov. 15, 1955 |
| 2,842,516 | Nitzsche et al. | July 8, 1958 |

FOREIGN PATENTS

| | | |
|---|---|---|
| 1,188,495 | France | Mar. 16, 1959 |
| 1,198,749 | France | June 15, 1959 |
| 1,220,348 | France | Jan. 4, 1960 |